United States Patent Office 2,957,772
Patented Oct. 25, 1960

2,957,772

METHOD OF COATING AND PROTECTING FROZEN MEAT

Leonard Irving Berkowitz, 429 Brookline St., Newton, Mass., and Sherman Gilbert Davis, 1A Kensington Heights, Worcester 2, Mass.

No Drawing. Filed Dec. 26, 1957, Ser. No. 705,149

2 Claims. (Cl. 99—194)

This invention relates to the preservation of meat, and particularly to its protection from contact with detrimental substances and deleterious agents, such as air, liquids and bacteria. It also relates to an improvement in the control freezing of meat as set forth in the co-pending application of Leonard I. Berkowitz Serial No. 435,076, filed June 7, 1954, now U.S. Patent No. 2,825,-652.

In accordance with said Berkowitz application, meat has been frozen by a procedure in which the surface portion is oxidized to a shallow depth, after which the meat is sealed in an air and moisture-proof bag and the air is exhausted to prevent further reaction. Subsequently, the meat in its bag is subjected to a rapid heat treatment for a few seconds which melts only the surface crystals and releases their juices. Thereafter, the meat is frozen completely while still protected. Also, if the bag is made of a heat shrinkable material, it may be shrunk into a tighter contact with the meat by the heat applied to melt the surface crystals.

We have found that such a procedure is laborious, expensive and time-wasting, in its requiring pre-forming a bag, inserting the meat therein and sealing the bag, as well as involving the problems inherent in exhausting air from the bag to prevent further oxidation and provide the necessary contact with the meat. Such a bag will not provide a satisfactory seal for meat having a cavity or a very rough surface. Also, the subsequent handling of the meat during freezing and transportation thereof may result in rupture of the bag, or the air seal contact of the bag with the meat may be insufficient to prevent a further and continuous oxidation which results in the gradual deterioration or undesired appearance of the meat. The bag may not make a tight contact with the meat and so permit a deleterious moisture-vapor transfer from the meat to the inside of the bag. Such a bag must, of course, be removed before the meat can be cooked, and it is at times difficult to separate the bag from the meat when the latter has been frozen, since the ice crystals may form a very tight union between the bag and the meat body. It is desirable that a protective envelope be either removed easily or that it be of a nature which will not interfere materially with the subsequent cooking of the meat or its consumption.

A primary object of this invention is to overcome such disadvantages by forming a protective coating in situ on the meat itself, wherein the coating is substantially impermeable to moisture and gases and has adequate strength to resist rupture during normal handling as well as freezing and will maintain an adequate continuous contact with the surface of the meat.

A further object is to provide an improvement in the control freezing of meat in which a film coating applied directly to the surface of the meat will both protect the meat from deleterious agents and permit heating the surface portion of the meat and the release of meat juices in the crystals and hold the same adjacent to the meat surface, after which the meat may be frozen solidly in that protected condition with a satisfactory color and other desired attributes which are maintained at the surface of the meat beneath the protective film.

A further object of the invention is to provide meat with a coating film which is non-toxic and may be edible, or which may be readily removed prior to or during a cooking operation and will leave the meat in its protected conditions as long as is needed.

Another object is to provide meat with a coating film which makes a very intimate contact with the surfaces of the meat, however irregular and rough in character, and which does not involve various disadvantages inherent in a bag structure into which the meat is inserted, and wherein the film will give the maximum protection for ground meat or other form of meat which has a very large surface area, such as thin slices of meat which are to be stacked and sold for use as patties.

In accordance with our invention we propose to coat the meat, whether a solid body or chunks or molded pieces or in a ground condition, with a plastic film forming substance, which forms a tough, strong continuous, cohesive and adherent film that is not only substantially impervious to bacteria and anticipated or normal moisture and gases and resistant to oil and grease normally contacted, but also comprises a non-toxic and preferably edible substance having no deleterious effects on the meat, and which is substantially insoluble in the atmospheric and meat moisture. We provide an intimate contact of the film with the exposed outer surfaces of the meat by applying the film substance as a hot melt of low viscosity by such procedures as spraying, brushing and dipping to obtain a complete and continuous coating on the meat product. For a film which will protect the meat in both the non-frozen and frozen condition, we prefer substances that are sufficiently transparent or translucent to permit satisfactory inspection of the meat and which are flexible under both cold and heat and resistant to rupture under the normal wear and tear of the handling of the meat.

The preferred film-forming substance is ethyl cellulose which is capable of forming a film when plasticized, blended, emulsified or modified with a non-toxic and preferably edible modifier capable of providing a homogeneous fluid of a viscosity suitable for the coating operation, as well as having other desired physical characteristics, such as homogeneity, adhesiveness, cohesiveness and other characteristics in the formed film.

As an example of the use of an ethyl cellulose composition, we provide a coating bath of ethyl cellulose plasticized with one or more vegetable or edible oils, such as corn oil, cottonseed oil, cocoanut oil, peanut oil, soya or soy bean oil, or various mixtures of oils, to obtain desired characteristics for the food products. The film forming substance should be free from deleterious or toxic substances such as castor and other non-edible vegetable oils, phosphates, chlorinated hydrocarbons, phthlates, amides and other such materials which have been previously compounded with ethyl cellulose for coating metal surfaces, glassware and other bodies not related to the field of foods. Such materials are toxic or otherwise unacceptable for use in forming meat protective films.

The ethyl cellulose, commercially sold as a powder, which is not water soluble, is available in different grades having variations in ethoxy content ranging from 2.15 to 2.60 ethoxyl groups per glucose unit. The preferred coating substance has an ethoxyl content ranging from 45 to 49.5% and preferably between 48.5 and 49.5%. Too low an ethoxyl content results in inadequate film strength. Too high a content gives a melting point of the gel that is too high for satisfactory application to the meat. Ethyl cellulose dissolves in the vegetable oil to form a gel of widely varying viscosity, depending on the proportions of the two ingredients and the ethoxyl content selected. The viscosity of the oil is low, but it is increased by adding the ethyl cellulose. They may be blended and used at a high temperature, such as 200° C. When cold, the gel is highly viscous and remains as a colloidal film on the meat, whether frozen or not. The viscosity of the mixture of ethyl cellulose and oil, when used at 160° to 210° F., may vary from 7 to 200 centipoises, but it is preferably used within the range of 40 to 60 centipoises. Too high a viscosity makes application difficult and the film is too tough. A low viscosity film lacks strength.

The proportions of the ethyl cellulose and plasticizer may be widely varied, depending on the selected oil and the process requirements, but we prefer to plasticize the ethyl cellulose with from 70% to 90% by weight of the vegetable oil. We may also blend different types of ethyl cellulose to get a desired viscosity or physical property of the film.

The composition of ethyl cellulose and oil of required fluidity and film strength characteristics is preferably applied by dipping or spraying or by brushing it onto the meat by means of a paint brush. One may tie a string or tape around the meat for suspension purposes and then dip the meat into a heated bath of the coating material, or the meat may be suitably suspended and the film substance applied by means of a suitable spraying apparatus. The temperature of the plasticized ethyl cellulose is maintained sufficiently high at or above the melting point of the ethyl cellulose composition to insure that the film substance is applied uniformly and forms a continuous film over the meat. The oils above listed have a low cloud point, so that the film is substantially transparent and displays the meat product therebeneath.

The coating treatment of a frozen meat, such as beef, whether ground or in substantially solid form, may be accomplished by initially freezing the meat at a temperature of —20° to —40° F. under oxidizing conditions. This may be accomplished by exposing the unfrozen meat to a blast of air at a temperature of —20 to —40° F. and thus freezing the meat, and simultaneously causing an initial oxidation of the non-frozen surface before it has cooled to a temperature of about 28° F., the freezing point of such meat, which insures that the surface is oxidized while it is being frozen. The oxidation will not penetrate a solid piece of meat to any great extent, but will be largely a surface effect.

This air blast treatment is carried on for a limited time, such as one hour per inch of depth of freezing for solid meats or for forty minutes for ground meat patties, or usually for a time which discontinues the oxidation of ground meat by the time it has penetrated to a depth of about ⅛ inch, which is considered a shallow oxidation. Since oxidation stops when the temperature of the meat falls below about 28° F., the treatment is self-limiting, and the specified time may be widely varied. If desired, the air blast may be continued until the meat is frozen fully or to any selected depth.

If the meat for coating has been frozen under non-oxidizing conditions, such as would occur if primal cuts were completely frozen and then subsequently cut up into smaller sections, the meat surface may be subsequently warmed up to about 28° F. and then subjected to an oxidizing action, as by means of a blast of air, for a few seconds or longer, depending on the nature of the meat, to insure a desired depth of penetration, such as ⅛ inch, of the surface oxidation. Then the meat is quickly re-frozen by suitable procedure, such as continuation of the air blast, and this stops further oxidation. The various procedures described in said Berkowitz patent may be adopted in this process, and reference is to be had to said patent for a description therof, and especially as to melting the surface crystals to insure retaining their juices beneath the protective layer thereover.

We have found that when the frozen meat is coated with ethyl cellulose composition coating substance held at a temperature of 160° to 210° C., at which the ethyl cellulose is molten, this high temperature serves to melt the surface crystals of the frozen meat and release the meat color into the surface portions. The crystallization point of the meat juices is approximately 28° F. and the initial temperature of the coating is well above that point and is capable of melting surface crystals and releasing the oxidized meat juices momentarily before they are re-crystallized. The film is, however, applied so rapidly that the crystal moisture is not lost by evaporation to any material extent and further oxidation of the meat is prevented. Hence, this coating treatment accomplishes the release of the surface crystal juices and yet holds them in place immediately beneath the coating. The release of crystal juices is accomplished within the few seconds involved in the coating operation. Hence, that heat release of the crystal juices is done simultaneously with the application of the hot coating. After the coating film has been applied, the meat may be quickly re-frozen, usually within a delay period of ten minutes, more or less, to prevent any deleterious rise in temperature. The meat in this frozen condition will retain the color that was released from the surface crystals, and this color will be visible through the substantially transparent film.

There is no critical film thickness, except as regards strength and continuity of film, but the film may usually vary from 0.001″ to several thousandths in thickness. We have found that the thickness of the coating can best be controlled by variation of the viscosity, such as by the addition of one or more of the plasticizers. For example, we prefer to use ethyl cellulose of comparatively high ethoxyl content and to render it sufficiently fluid for the coating operation by means of a plasticizing oil which insures that the film will flow into the irregular contour areas of the meat and form a continuous coating. The tight contact of the film with the meat provides no space for water transfer and so prevents an interchange of moisture and vapor between the meat and the under side of the coating, which might result in further crystallization at the surface and a loss of desirable characteristics.

It will now be appreciated that in accordance with this invention, we have provided a procedure for protecting meat from a loss of juices, flavor and color through dehydration as well as a freezer burning action which causes the fats immediately underneath dessicated areas to become oxidized and more or less rancid and wherein the proteins become irreversibly dehydrated with the consequent drying and toughening of the tissues. The coating further prevents a slow oxidation of the surface layer of the red meats in the presence of air. Under ordinary freezing procedure, a freshly cut beef of a dull purplish color is oxidized to a desirable bright red color in the presence of air wherein hemo-globin or myo-globin is converted to oxy-globin or oxy-myo-globin containing ferrous iron. By a continued oxidation, the substances are found converted to the ferric iron condition of met-hemo-globin or met-myo-globin which gives an objectionable brownish or dark color to the meat. This darkening of the meat by oxidation of the pigments is associated with deterioration of the meat to a much less desirable quality and salability. Hence, the coating protection, and particularly after a red meat has had the color of frozen surface crystals released by heat beneath the coating, retains the desirable bright red color that the public associates with good meat. When the meat is frozen after the coating has been applied, this color is retained immediately beneath the coating.

According to this invention, we protect meat by the steps of applying to the exposed meat surfaces a continuous cohesive film coating adhering to the exposed meat surfaces which is non-toxic, substantially impervious to gases and bacteria, substantially insoluble in the atmospheric and meat moisture, resistant to rupture under normal handling conditions and is not deleteriously affected by normal freezing and room temperatures and maintains a continuity of protective film structure, and thereafter subjecting the meat to a temperature between —20° and —40° C. to freeze the meat to a solid condition. This method furthermore comprises the steps of treating the surface portion of the meat at a temperature above about 28°° F. with air to oxidize a surface layer and subjecting the meat to a temperature between about —20° and —40° F. to freeze said portion, coating the exposed surface of the meat while frozen with a fluid substance heated to a temperature above 28° F. which forms in situ a continuous, tightly adherent non-toxic film capable of protecting the meat during freezing and handling stages and simultaneously melts the meat surface crystals to release their juices beneath the coating being formed, and subsequently freezing the meat to a solid condition while sealed beneath the coating and preserving the meat color of the oxidation stage, and wherein the film forming substance comprises ethyl cellulose plasticized with a non-toxic and preferably edible vegetable oil proportioned to protect the meat.

We claim:

1. The method of freezing and protecting meat comprising the steps of treating with air the surface portion of the meat and oxidizing it at a temperature not below about 28° F. for a controlled period of time which causes oxidation of the meat to a depth of not over about one eighth inch and freezing the meat surface to a solid condition to stop the oxidation, maintaining the body portion of the meat frozen and applying to it a coating of a non-toxic plastic film substance in a molten condition above the melting point of surface meat juice crystals and thereby melting said crystals and releasing the oxidized juices beneath the coating without thawing the body of the frozen meat materially below said oxidized depth, cooling the coating and the surface portion of the frozen meat to re-crystallize the juices and to set the coating as a protective film envelope enclosing the re-crystallized surface meat juices which prevents further oxidation, and subsequently refrigerating the meat at a temperature between about —20° and —40° F. for storage.

2. The method according to claim 1 in which the film coating comprises ethyl cellulose having an ethoxyl content between 45 and 49.5% and from 70 to 90% of a non-toxic vegetable oil plasticizer proportioned to provide a viscosity at 160° to 210° F. between 40 and 60 centipoises, and wherein the coating is applied at a temperature between 160° F. and 210° F, and the oxidized surface crystals are thereby momentarily melted to release their juices.

References Cited in the file of this patent

UNITED STATES PATENTS

| | | |
|---|---|---|
| 2,394,101 | Phillips et al. | Feb. 5, 1946 |
| 2,825,652 | Berkowitz | Mar. 4, 1958 |
| 2,840,474 | Wirt et al. | June 24, 1958 |
| 2,840,475 | Patten et al. | June 24, 1958 |
| 2,840,476 | Wirt et al. | June 24, 1958 |